Sept. 18, 1923.

G. J. WESKE ET AL 1,468,587

SAFETY NONSTOP LATHE CHUCK

Filed April 10, 1922    2 Sheets-Sheet 1

WITNESS:
C. W. Markward

George J. Weske
Oscar H. Prange
Arthur F. Gensler
INVENTORS

BY Victor J. Evans
ATTORNEY

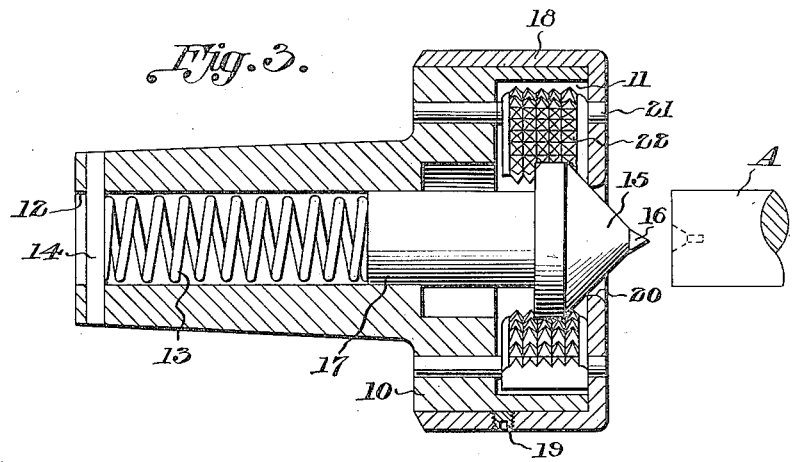
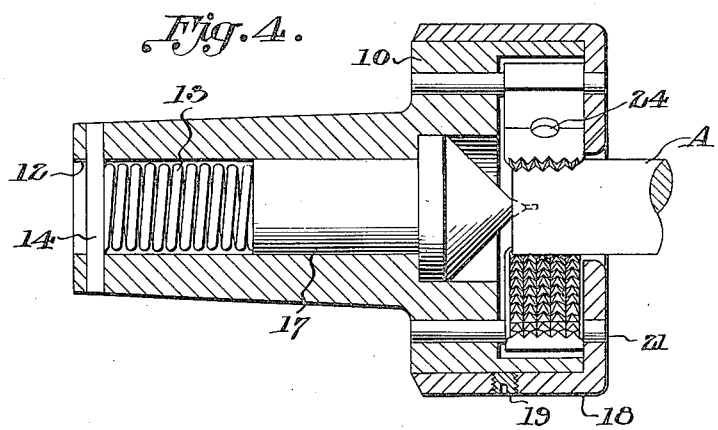
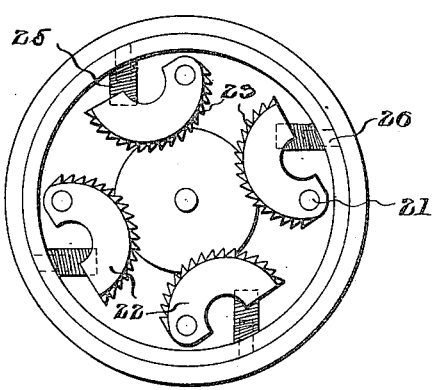

Patented Sept. 18, 1923.

1,468,587

UNITED STATES PATENT OFFICE.

GEORGE J. WESKE, ARTHUR F. GENSLER, AND OSCAR H. PRANGE, OF CLEVELAND, OHIO.

SAFETY NONSTOP LATHE CHUCK.

Application filed April 10, 1922. Serial No. 551,384.

*To all whom it may concern:*

Be it known that we, GEORGE J. WESKE, ARTHUR F. GENSLER, and OSCAR H. PRANGE, citizens of the United States, respectively, residing at Cleveland, in the county of Cuyahoga and State of Ohio, have invented new and useful Improvements in Safety Nonstop Lathe Chucks, of which the following is a specification.

This invention relates to lathe chucks, particularly to that type designed for use in turning shafting, pins or any round objects that require turning from two lathe centers, and has for its object the provision of a novel device of this character which is provided with work gripping means which automatically operate when the work is pressed into it by means of a screw on the tail stock of the lathe and which automatically releases the work when such tail stock screw is turned out or unscrewed, this feature permitting the insertion and removal of work without necessitating the rotation of the chuck or the operation of the lathe.

An important object is the provision of a device of this character in which the work to be turned lies dormant between the chuck body center and the head center of the lathe, that is the center at the tail stock thereof, and does not revolve until the dead center is advanced for forcing the work into and between the clamping jaws of the chuck, the device thus operating to serve as a great safety element in protecting the workman against injury such as frequently occurs during the use of the ordinary and well-known types of chucks.

Still another object is the provision of a chuck of this character which is adapted to grip work of different sizes whereby its range of usefulness will be greatly increased.

An additional object is the provision of a device of this character which will be simple and inexpensive in manufacture, easy to control and use, positive in action, efficient and durable in service, and a general improvement in the art.

With the above and other objects and advantages in view, the invention consists in the details of construction to be hereinafter more fully described and claimed, and illustrated in the accompanying drawings, in which:—

Figure 3 is a longitudinal sectional view through the chuck itself in inactive position.

Figure 4 is a similar view showing the parts in operative or locking position,

Figure 5 is a cross section showing a face view of the locking jaws,

Figure 1:
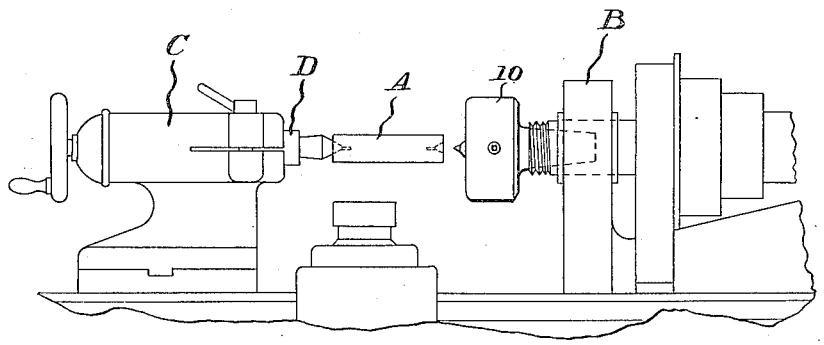
Figure 1 is a somewhat diagrammatic side elevation of a lathe equipped with our chuck and showing the work in inactive position.
Figure 2:
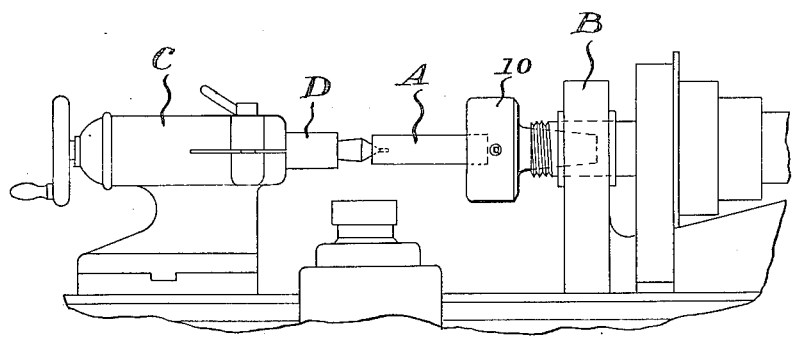
Figure 2 is a similar view showing the work in active or revolving position.

Referring more particularly to the drawings, the numeral 10 designates the chuck body which is made preferably of a steel forging, and which is chambered out as indicated at 11 whereby to provide means for the accommodation of certain elements to be described. Formed upon this body 10 is an elongated tubular extension 12 within which is located a coil spring 13 which has one end abutting against the pin 14 which extends transversely across the tubular extension. Associated with this body 10 is a lathe center which includes a conical head member 15 having a relatively fine point 16 and having formed integrally therewith an elongated shank 17 slidably engaged within the tubular extension 12 and which engages against the other end of the coil spring 13. Disposed in encircling relation to the body member 10 is a shell or cap 18 which is held in position with respect to the body 10 by means of a suitable screw 19 and which has one end open and which has its other end closed except for a central opening 20 of a size sufficient to accommodate the head 15.

Suitably secured within the body 10 and extending into the chamber 11 is a circumferentially disposed series of pins or bearing rods 21 which are threaded or otherwise secured with respect to the body 10 and upon which are pivotally engaged clamping jaws 22 which are eccentrically pivoted as shown and which have cam like faces 23 formed with teeth arranged in the relative positions disclosed. These clamping jaws 22 have their free end portions formed with recesses 24 within which are engaged the ends of coil springs 25 which have their other ends engaged upon lugs or pins 26 projecting inwardly from the chambered portion of the body 10. By this construction it will be seen that the locking members 22 are always urged toward the center of the device so as to be ready for engagement with any article to be turned by the chuck.

Figure 6:
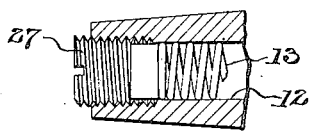
Figure 6 is a fragmentary section showing a slight modification.

Instead of having the outer end of the spring 13 engaged by the transverse pin 14 above described, it may be preferable to provide an adjustable screw 27 which is threaded through the outer end of the extension 12 whereby the tension on the spring may be varied as may be found necessary in certain conditions. This adjustable screw structure is illustrated in Figure 6 of the drawing and it is believed that the operation and advantages thereof will be readily apparent without a more extended description.

The letter A designates the work to be turned, B designates the head stock of the lathe within which our chuck is disposed for rotation and C designates the tail stock having the usual screw center D.

The operation of the device is as follows:

The work to be turned is so positioned that one end will be engaged upon the point 16 of the center member 15 with its other end engaged upon the screw center D at the tail stock of the lathe. Initially, that is under ordinary circumstances, the center member 15 is forced outwardly by the spring 13 and the engagement of the member 15 with the jaws 22 will cause them to be held in their outermost or expanded position against the resistance of the springs 25 which are associated with the jaw members. When the operator subsequently turns the screw center D of the tail stock of the lathe in a clockwise direction, it will be apparent that the work A will be forced into the body of the chuck and this will permit the spring pressed jaws 22 to come into engagement with the work and owing to the fact that these jaws are of cam-like construction and have toothed bearing faces it is apparent that they will effectually grip the work and hold it so that it will rotate with the constantly rotating chuck. When the turning of the work is completed, the chuck will open automatically by turning the screw center D in a counter-clockwise direction so that the pressure spring 13 will operate to move the center member 15 outwardly, this member being conical in shape forcing the jaws 22 outwardly out of gripping relation with the work and permitting the work to be released without requiring the stopping of the rotation of the chuck.

From the foregoing description and a study of the drawings, it will be apparent that we have provided a very simply constructed and consequently inexpensive chuck which will be highly advantageous in use, and time saving inasmuch as it is unnecessary to stop the rotation of the chuck when placing the work within it or removing the work. Furthermore, the device will operate with certainty as a safety element and protect the workmen against injury owing to the fact that the work is not gripped by the jaws of the chuck until the dead center or rear center of the lathe is turned to force the work into the chuck. Owing to the simplicity of the construction and the fewness of the parts, it is apparent that there is nothing to get out of order and that the device should consequently have a long life and satisfactorily perform all the functions for which it is intended.

While we have shown and described the preferred embodiment of the invention, we desire to have it understood that we do not limit ourselves to what is herein shown and described, and that such changes may be made in the construction and arrangement of parts as will not depart from the spirit of the invention, or the scope of the subjoined claims.

What is claimed is:—

1. A chuck of the character described comprising a body formed with a chambered out portion and provided with an elongated hollow extension, a center member slidably disposed within the hollow extension, a spring located within the extension and engaging said center member for normally forcing the latter outwardly, a cap member encircling the body member and formed with an opening for the passage of work thereinto, and a plurality of spring pressed locking jaws pivoted within said chambered portion of the body.

2. A chuck of the character described comprising a body formed with a chambered out portion and provided with an elongated hollow extension, a center member slidably disposed within the hollow extension, a spring located within the extension and engaging said center member for normally forcing the latter outwardly, a cap member encircling the body member and formed with an opening for the passage of work thereinto, and a plurality of spring pressed locking jaws pivoted within said chambered portion of the body, and means for adjusting the tension of said spring.

3. A chuck of the character described comprising a body formed with a chambered out portion and provided with an elongated hollow extension, a center member slidably disposed within the hollow extension, a spring located within the extension and engaging said center member for normally forcing the latter outwardly, a cap member encircling the body member and formed with an opening for the passage of work thereinto, a plurality of spring pressed locking jaws pivoted within said chambered portion of the body, said locking jaws being of cam-like formation and having their faces formed with ratchet like teeth.

4. A chuck of the character described comprising a cylindrical body member formed with a chambered out portion and formed also with an elongated extension having a bore, a center member located within said chambered out portion and formed with an elongated shank slidably engageable within said bore, said center member having its other end terminating in a conical bearing point for work to be turned, an adjustable spring mounted within said bore and engaging the shank of said center member, a cap closing the open end of said body and having a central opening for permitting the passage of work into the body, a plurality of pins extending from the body into said chambered out portion, a series of locking jaws pivoted upon said pins and of cam-like formation with their faces provided with serrations, and springs for forcing said locking jaws normally toward the center of said body.

5. A chuck of the character described comprising a body carrying a hollow extension and formed with a chamber, a spring pressed work engaging and centering plunger movably mounted within the hollow extension, and a plurality of locking jaws pivoted in the chamber and spring pressed toward said centering plunger.

6. A chuck of the character described comprising a body formed with a chamber and a bore, a work centering plunger member slidably mounted within said bore and spring pressed toward the chamber, and a plurality of locking jaws pivoted within the chamber, and springs urging said jaws toward the center line of the body, said jaws being of arcuate shape and pivoted at one end.

In testimony whereof we affix our signatures.

GEORGE J. WESKE.
OSCAR H. PRANGE.
ARTHUR F. GENSLER.